United States Patent [19]

Schmohe

[11] 4,042,088
[45] Aug. 16, 1977

[54] LOW SPEED DISCONNECT
[75] Inventor: James S. Schmohe, Rockford, Ill.
[73] Assignee: Sundstrand Corporation, Rockford, Ill.
[21] Appl. No.: 643,253
[22] Filed: Dec. 22, 1975
[51] Int. Cl.² .............................................. F16D 13/60
[52] U.S. Cl. ................... 192/114 R; 74/15.66; 74/687
[58] Field of Search ............... 192/56 R, 93 C, 94, 192/114 R; 74/15.66, 15.88, 687

[56] References Cited
U.S. PATENT DOCUMENTS

| 2,185,537 | 1/1940 | Brownlee | 192/94 |
|---|---|---|---|
| 2,332,862 | 10/1943 | LeTourneau | 192/94 |
| 2,626,692 | 1/1953 | Sloan | 192/93 C |
| 2,702,107 | 2/1955 | Hahn | 192/93 C |
| 2,725,770 | 12/1955 | Short et al. | 192/56 |
| 2,782,892 | 2/1957 | Hannon | 192/93 C |
| 3,176,811 | 4/1965 | Smith | 192/93 C |
| 3,365,981 | 1/1968 | Gantzer | 74/687 |
| 3,576,143 | 4/1971 | Baits | 74/687 |

Primary Examiner—Samuel Scott
Assistant Examiner—Wesley S. Ratliff, Jr.
Attorney, Agent, or Firm—Wegner, Stellman, McCord, Wiles & Wood

[57] ABSTRACT

In constant speed drive mechanisms, a low speed disconnect between the input and driven elements is provided. The low speed disconnect is effected by a worm (and plunger-engaged) gear arrangement that axially moves the driven element through a spring differential to a disconnected position and then a one-way ratchet is engaged to prevent the disconnected driven element from returning to partial or full reengagement with the input element.

12 Claims, 3 Drawing Figures

LOW SPEED DISCONNECT

BACKGROUND OF THE INVENTION

1. Field of the Invention

This invention relates to a constant speed drive mechanism and more particularly to a low-speed disconnect between an input and output that cannot accidentally return to a reengaged position.

2. Description of the Prior Art

In many areas, and particularly in the aircraft field, it is required to operate certain accessories with a constant frequency source of power. Accordingly, a generator or alternator must be driven at a constant speed. The source of the driving power is quite variable due to the demands for the higher or lower speeds from the prime mover.

Between the prime mover and the constant speed drive transmission is a form of clutching arrangement which is adapted to connect the output of the prime mover to the input of the transmission in such a way that the driving train can be interrupted under certain conditions, for instance, upon overheating in the transmission, generator breakdown in the system, or the like, where the prime mover is still operating. This can best be handled by disconnecting the prime mover from the constant speed transmission so as to prevent damage to the transmission and/or to the generator.

Heretofore, a plunger-actuated gear element was moved into engagement with a worm which in turn was splined to a coupling member whereby the worm moved along the gear element to disengage the coupling member from the input shaft. Under normal high speed conditions, the plunger-actuated gear element will drop in behind the worm to hold the coupling member in disengaged relationship with respect to the input member. However, when the speed of the input member is relatively low, the plunger-actuated gear element and worm are effective to disconnect the coupling member from the input shaft, but, even though the teeth of the coupling member are disengaged from the teeth on the input shaft, the space therebetween is relatively little, and there is not sufficient speed or momentum in the coupling member to drive the worm off the end of the plunger-actuated gear element. As a result, vibration caused by the prime mover can cause the worm to gradually rotate back relative to the plunger-engaged gear until the teeth on the coupling member come in contact with the teeth on the input shaft, causing damage to the teeth and, in some cases, reengaging the coupling member to drive the transmission and the generator even though one or the other or both may have failed.

SUMMARY OF THE INVENTION

In the improved low speed disconnect apparatus, a first urging means is provided for holding the coupling member in engagement with the input shaft, and a second urging means operates against the coupling member attempting to disengage the coupling member from the input shaft after worm movement has relieved the coupling member of the first urging means. As a further improvement, the worm is provided with ratchet teeth which are aligned with a one-way detent on the housing such that as the coupling member becomes disengaged by the urging of the second urging means, the ratchet will engage with the one-way detent, permitting the worm to rotate in a disengaging direction, but preventing the worm from rotating in a direction toward reengagement of the coupling member with the input shaft.

If the speed of the input shaft and coupling member is sufficient to run the worm off the end of the plunger-actuated gear, the plunger-actuated gear will engage behind the worm and lock the coupling member out of engagement with the input shaft as heretofore. However, in the event that the speed of the input shaft and coupling member is not sufficient to run the worm completely off the plunger-actuated gear, the ratchet teeth on the coupling member will advance relative to the one-way detent as long as there is sufficient momentum, but when the worm and coupling member stop rotating, the one-way detent will prevent the coupling member from rotating backwardly and therefore will prevent the coupling member from reengaging with the input shaft. The clutch teeth on the coupling member are retracted out of contact with the input shaft to a fully retracted position by the second urging means. In this way, the connection between the input shaft and the coupling member will be held disengaged in a positive fashion and the likelihood of damage to the constant speed drive or to the auxiliary equipment connected thereto will be prevented.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
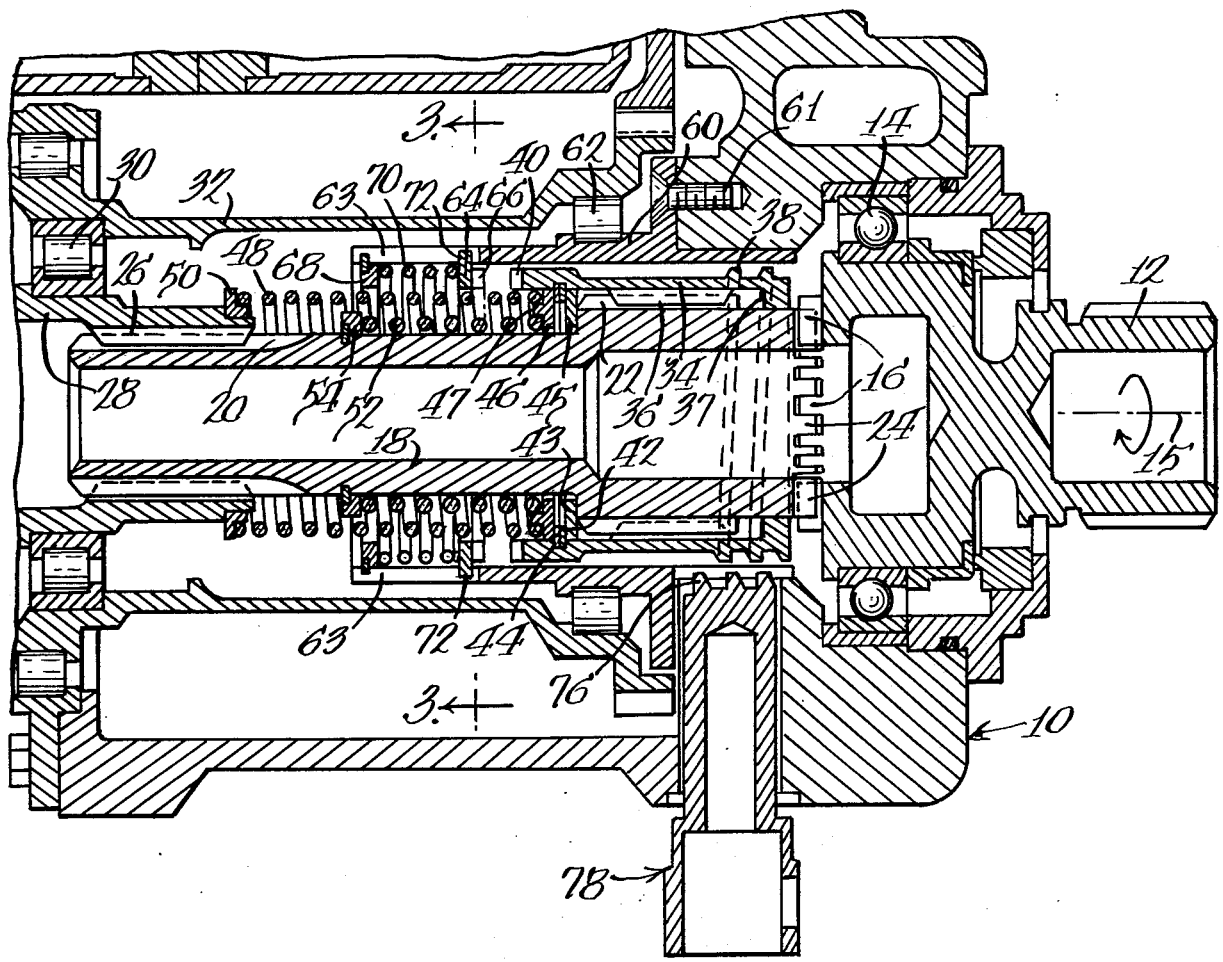
FIG. 1 is a fragmentary cross-sectional view taken on a vertical plane through the clutch or connecting section between a prime mover and a constant speed transmission.

The invention is directed toward a disconnect or coupling mechanism of a constant speed drive of the type described in U.S. Pat. Nos. 3,576,143 and 3,365,981, both assigned to Sundstrand Corporation, the assignee of the present application. The constant speed drive mechanism, most of which is not shown, has a housing 10 through one wall of which extends an input shaft 12. The external part of the input shaft 12 has splines on the outer surface thereof for engagement with the output of a prime mover, such as an aircraft engine, not shown. The input shaft 12 is mounted in bearings 14 in the housing so as to be freely rotatable about an axis 15 of said input shaft. The axially inwardly projecting end portion of the input shaft 12 has a plurality of angularly spaced clutch teeth 16 formed in a circular pattern concentric about the axis 15 of the input shaft.

Mounted on the inside of the housing and in axial alignment with the input shaft 12 is a coupling member 18 which is exteriorly splined at 20 and 22 on the outer surface of each end portion thereof. The axial end of the coupling member facing the input shaft 12 has a plurality of circumferentially spaced clutch teeth 24 which are adapted to mesh with the clutch teeth 16 formed on the input shaft 12. The spline teeth 20 on the left end portion of the coupling member 18 engages with internal spline teeth 26 on the interior end portion of a driven member 28 of a constant speed drive transmission. The driven member 28 is mounted in bearings 30 in a portion 32 rotatably supported on the inside of the housing 10 so that the driven member 28 is free to rotate about its axis, which axis coincides with the axis of input shaft 15. With the clutch teeth 16 on the input shaft 12 in engagement with the clutch teeth 24 on the coupling member 18, the driven member 28 is driven with the same speed of rotation as the input shaft 12. The constant speed transmission downstream from the disconnect mechanism converts the different speeds of rotation of the input member 12 to a constant output speed of rotation as is taught by the above-mentioned patents.

A sleeve member 34 is disposed concentrically about the right end portion of the coupling member 18 and has internal spline teeth 36 engaging with the spline teeth 22 on the right end of the coupling member whereby the sleeve 34 will rotate with the coupling member 18 and is axially slidable relative to said coupling member 18. In order to withdraw clutch teeth 24 from clutch teeth 16, sleeve 34 has an inwardly directed annular flange 37 engageable with the end of spline 22 on the coupling member 18.

The sleeve 34 has a worm thread 38 formed around one end portion thereof and has a plurality of axially facing ratchet teeth 40 projecting from the opposite end portion thereof. A snap ring 42 is seated in an internal groove 44 formed on the inner surface of the left end portion of the sleeve 34. A stop washer 45 is positioned within the sleeve 34 and is located between the snap ring 42 and a shoulder 43 on the outer surface of the coupling member 18. An annular ring member 46 having an axially extending collar 47 on one face thereof is positioned inside the sleeve 34 and is urged against the ring 42 by one end of a compression spring 48 which has its other end urged against an annular spring seat 50 on the end of the driven member 28. The collar 47 on the member 46 separates the spring 48 from a second spring 52 which has one end bearing against the ring member 46 and has its other end bearing against an annular spring seat 54 on the outer surface of the coupling member 18.

The spring 48 bears against the ring member 46 to urge the washer or ring 45 against the shoulder 43 formed on the coupling member 18 such that the spring force retains the clutch teeth 24 on the coupling member in engagement with and in mesh with the clutch teeth 16 on the input shaft 12. In this way, the drive from the shaft 12 is transmitted through the coupling member 18 to the driven member 28.

An annular bearing support 60 surrounds the sleeve 34 and a portion of the coupling member 18, and the support 60 is mounted to the housing 10 by means of screws 61. A bearing 62 surrounds the support 60 and rotatably supports torque tube 32 of the transmission. The left end of the annular bearing support 60 has a pair of axially extending slots 63 formed inwardly from one end thereof. An annular ratchet 64 is mounted in the annular bearing support 60 and has one-way detent teeth 66 projecting axially toward the ratchet teeth 40 formed on the left end of the sleeve 34. An annular spring seat 68 is retained by a snap ring in the left end of the annular bearing support 60 and retains the left end of a compression spring 70, with the other end of said spring 70 bearing against the ratchet 64. The ratchet 64 is retained against rotation relative to the annular bearing support 60 by means of lugs 72 which project radially outwardly from the ratchet 64 and engage in the axially extending slots 63 in the end portion of the bearing support 60. The arrangement of the lugs 72 within the slots 63 in the bearing support 60 makes it possible for the ratchet 64 to be moved toward the left relative to the support 60 against the force of the spring 70. With the sleeve 34 rotating and being moved toward the ratchet 64, the ratchet teeth 40 on the sleeve engage with the detent teeth 66 whereupon the sleeve 34 is permitted to rotate in one direction relative to the bearing support 60 but the one-way teeth 66 on the ratchet 64 prevents the sleeve 34 from rotating in the opposite direction. The spring-urged ratchet 64, due to its mounting relative to the bearing support 60, will permit the sleeve 34 to move the ratchet 64 to the left relative to the bearing support against the compressive force of the spring 70.

A small segment of rack gear teeth 76 is adapted to mate with the worm 38 and is formed on the inner end of a plunger assembly 78. The assembly 78 is structurally the same and operates the same as disclosed in the above prior art patents and is designed to move the teeth 76 into engagement with the worm 38 on the sleeve 34. The plunger assembly 78 is actuated either manually from the cockpit of an airplane or automatically upon overheating of the transmission, upon overload of the generator, or the like. Upon actuation of the assembly 78, the gear teeth 76 engage with the worm 38 whereupon the rotation of the sleeve 34 by the input shaft 12 will cause the sleeve 34 and the coupling member 18 to be moved to the left to disconnect the meshed teeth 24 on the coupling member 18 from the teeth 16 on the input shaft 12. The detailed operation of the disconnecting of the coupling member from the shaft will be described more in detail hereinafter. The plunger assembly 78 has a reset handle or reset mechanism which permits the manual or automatic resetting of the assembly 78 to move the gear teeth 76 out of engagement with the worm 38, whereupon the spring 48 will drive the teeth 24 on the coupling member 18 into mesh with the teeth 16 on the input shaft 12.

When, as has been the case heretofore, the input shaft 12 is rotating at a moderate or high speed, e.g., approximately 4,000 rpms, actuation of the assembly 78 will drive the gear teeth 76 into engagement with the worm 38, whereupon the rotation of the input shaft 12 and the coupling member 18 will cause the sleeve 34 to progress axially relative to the teeth 72 and relative to the coupling member 18 to a position (not shown) where the inwardly directed flange 37 on the sleeve engages the spline 22 on the coupling member to positively move the coupling member axially toward the left to a position (not shown) where the teeth 24 on the coupling member 18 disengage the teeth 16 on the input shaft 12. With the moderate or high speeds that were transmitted to the coupling member 18, the momentum of the coupling member and the sleeve 34 will continue to move the coupling member 18 to the left after the teeth 24 and 16 have separated until the worm 38 runs off the teeth 76 on the assembly 78, whereupon the plunger assembly 78 will drive the gear 76 behind the right end of the sleeve 34 to hold the coupling member 18 locked against reengagement with the input shaft 12. When it is desired to reconnect the transmission to the input shaft 12, the assembly 78 is retracted to pull the gear teeth 76 out of alignment with the coupling member 18, whereupon the spring 48 will drive the coupling member 18 to the right with the teeth 24 meshing with the teeth 16 on the input shaft 12.

When the input shaft 12 is running at low speeds and the assembly 78 is actuated to drive the gear teeth 76 into mesh with the worm 38, there is sometimes not sufficient momentum to move the coupling member 18 sufficiently to the left to permit the gear teeth 76 to latch behind the sleeve 34 on the coupling member 18. Heretofore, with the gear teeth 76 still engaged with the worm 38 and the coupling member 18 not rotating, it was possible for the vibration from the engine to cause the coupling member 18 to slowly rethread the worm 38 relative to the gear teeth 76 until the teeth 24 remeshed or partially remeshed with the teeth 16, thereby causing damage not only to the teeth 24 and 16, but also to any of the downstream transmission or auxiliary equipment which may have overheated.

With the improved construction, when the input shaft 12 is rotating at low speeds, for example as low as 1 rpm, and the plunger 78 is actuated to engage the rack gear teeth 76 with the worm 38, the sleeve 34, rotating with the coupling member 18, threads its way axially along the coupling member 18 to a position (not shown) where the inwardly directed flange 37 engages the right end of the splines 22 on the coupling member, whereupon continued rotation of the worm positively moves the clutch teeth 24 to a position (not shown) out of contact with the input clutch teeth 16. Axial movement of the sleeve 34 in the manner described, moves the snap ring 44 away from the input member, so that there is no force applied by the ring 45 against the shoulder 43 on the coupling member. Thus, the bias of the spring 48 is no longer applied to urge the coupling member toward the input shaft. At the same time, such axial movement of the sleeve 34 compresses the normally relatively uncompressed spring 52 in a manner to urge the coupling member 18 away from the input shaft 12. Ultimately, the spring 52 moves the coupling member 18 to the position shown in FIG. 2 where the shoulder 43 on the coupling member engages the ring 45 in the sleeve, with the latter in the left most position illustrated in FIG. 2.

Figure 2:
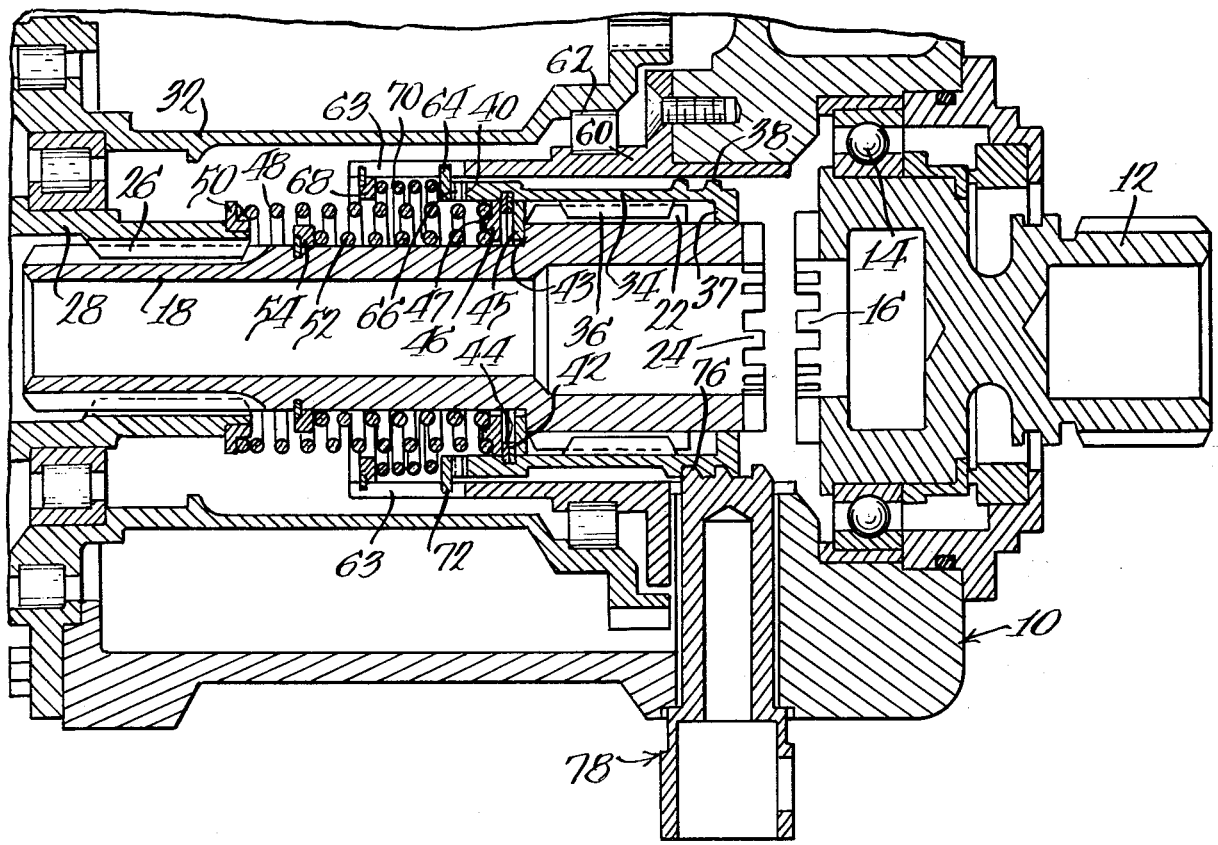
FIG. 2 is a cross-sectional view similar to FIG. 1, showing the coupling between the input member and the coupling member disengaged; and, FIG. 3 is a cross-sectional view taken along the lines 3—3 of FIG. 1.
Figure 3:
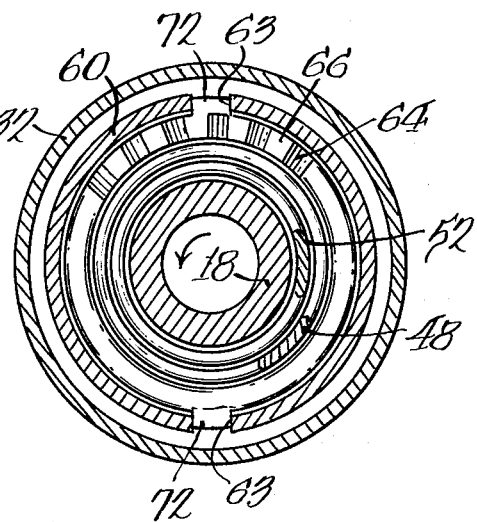

Before the clutch teeth 24 disconnect from clutch teeth 16, the ratchet teeth 40 on the end of the sleeve 34 will engage with the one-way clutch detent teeth 66 on the ratchet 64. As the momentum of the sleeve 34 continues to turn the sleeve 34, it will be moved further to the left as shown in FIG. 2, moving the lugs 72 on the ratchet 64 in the guide slots 63 and against the compression of the spring 70. Spring 70 urges the lugs 72 on the ratchet member 64 to the right in the slots 63 formed in the bearing support 60. Once the ratchet teeth 40 on the sleeve 34 engage with the one-way teeth 66 on the ratchet 64, the sleeve 34 is permitted to continue to rotate in one direction and to move axially relative to the bearing support 60 by compressing the spring 70 as the ratchet 64 is moved to the left. Assuming the momentum from the input member 12 to the coupling member 18 and sleeve 34 is insufficient to cause the plunger assembly 78 to seat gear 76 behind the sleeve 34 and, accordingly, the coupling member 18 comes to rest with the worm 38 still in engagement with the gear teeth 76, as shown in FIG. 2, the teeth 24 will continue to be held disengaged from the teeth 16, and no further rotational forces will be transmitted from the input shaft 12 to the driven member 28. The detent ratchet 64 with the one-way teeth 66 in engagement with the clutch teeth 40 will prevent the sleeve 34 and the coupling member 18 from moving back toward the right and thereby will prevent reengagement of the teeth 24 with the teeth 16.

When it is desired to recouple the coupling member 18 to the input shaft 12, the same operation as previously described takes place, namely the plunger assembly 78 is deactivated to retract the gear teeth 76 from their engagement with the worm 38. Immediately upon disconnecting the gear teeth 76 from the worm 38, the spring 48 will be reapplied to coupling member 18 by driving the collar 46, ring 42, and washer 45 against shoulder 43 to drive the sleeve 34 and coupling member 18 to the right to remesh the teeth 24 on the coupling member with the teeth 16 on the input shaft 12.

From the above, it can be seen that a low-speed disconnect has been provided which prevents the constant speed drive transmission from reengaging accidentally with the input shaft 12 until some affirmative action is taken to reengage the drive therebetween.

I claim:

1. In a constant speed drive transmission having a housing, an input shaft extending into said housing, axially inwardly extending clutch teeth on the inner end of said input shaft, a splined coupling member axially aligned with said input shaft, clutch teeth axially extending from one end portion of said coupling member and adapted to mesh with said clutch teeth on said input shaft, a driven member splined to the other end portion of said coupling member, a sleeve encircling said coupling member and having a worm around the outer periphery thereof, said sleeve being splined to said coupling member for relative axial movement with respect to said coupling member, ratchet teeth formed on one axial end of said sleeve, an axially movable one-way detent teeth means carried by the housing and extending toward said ratchet teeth, means for resiliently urging said one-way detent teeth means toward said sleeve, first resilient means acting between said driven member and said sleeve to urge the sleeve toward the input shaft, means on the sleeve engaging the coupling member for urging said coupling member into coupled relationship with the input shaft, second resilient means acting between said coupling member and said sleeve for urging the coupling member away from the input shaft, and gear means movable into contact with said worm on said sleeve whereby the rotation of the input shaft and the coupling member will thread the worm along the coupling member away from the input shaft to positively disconnect the teeth on the coupling member from the teeth on the input shaft and will engage the ratchet teeth on the sleeve with the one-way detent teeth to permit the sleeve and coupling member to be moved axially away from the input shaft but prevent the sleeve from rotating reversely while the second resilient means prevents the coupling member from reengaging with said input shaft.

2. In a constant speed drive transmission having a housing, an input shaft extending into said housing, coupling means in said housing axially aligned with and selectively driven by said input shaft, a driven member splined to the other end portion of said coupling means, worm means splined to said coupling means for relative axial movement with respect to said coupling means, ratchet means on one end of said worm means, axially movable one-way detent teeth means extending toward said ratchet means, means acting between said driven member and said coupling means through the worm means for urging said coupling means into coupled relationship with the input shaft, second means acting between said coupling means and said worm means, and gear means movable into contact with said worm means whereby rotation of the input shaft and coupling means will thread the worm and coupling means away from the input shaft to disconnect the coupling means from the input shaft and will engage the ratchet means with the one-way teeth means which permits the coupling means to be moved axially away from the input shaft and prevents the coupling means from reengaging with said input shaft.

3. In a constant speed drive transmission having a housing, an input shaft, a splined coupling member aligned with and driven by said input shaft, a driven member splined to the other end portion of said coupling member and being driven by said coupling member, means for axially moving said coupling member out of coupling engagement with said input shaft, ratchet means carried by said coupling member and being movable with said coupling member, one-way detent teeth means engageable by said ratchet means for restricting said ratchet means and said coupling member to rotation in one direction, first means for urging said coupling member into coupled relationship with the input shaft, second means acting between said coupling member and said ratchet means for urging said coupling member toward an uncoupled relationship with the input shaft, and means for actuating said means for axially moving said coupling member whereby the ratchet means engages with said one-way detent teeth means to permit the coupling means to be moved away from the input shaft while preventing the coupling means from reengaging with said input shaft.

4. In a constant speed drive transmission as claimed in claim 3, said ratchet means being formed on a sleeve member splined to said coupling member.

5. In a constant speed drive transmission as claimed in claim 4, said sleeve member having an external worm thread formed thereon, and said means for axially moving said coupling member includes gear teeth engageable with said worm thread for moving said coupling member out of engagement with said input shaft.

6. In a constant speed drive transmission as claimed in claim 5, the coupling between the input shaft and the coupling member comprising meshing teeth carried by the input shaft and by the coupling member.

7. In a drive transmission having a housing, an input shaft, coupling means axially aligned with and selectively driven by said input shaft, a driven member splined to the other end portion of said coupling means, worm means splined to said coupling means for relative axial movement with respect to said coupling means, first spring means acting between said driven member and said worm means for urging said coupling means into coupled relationship with the input shaft, second spring means for acting between said coupling means and said worm means to urge the coupling means away from the input shaft, and means movable into contact with said worm means whereby the rotation of the input shaft and coupling means will thread the worm to compress the first and second spring means, said second spring means urging the coupling means away from the input shaft to disconnect the coupling means from the input shaft.

8. In the drive transmission as claimed in claim 7, said means movable into contact with said worm means comprising a gear which is driven into meshing relationship with said worm means.

9. In the drive transmission as claimed in claim 7, one-way ratchet means carried by said coupling member and mating one-way detent teeth means carried by the housing whereby upon disconnection of the coupling means from the input shaft, the ratchet means will engage with the detent teeth means to permit relative rotation between the coupling means and the housing in one direction and to prevent relative rotation therebetween in the opposite direction.

10. In a drive transmission having a housing, an input shaft, a splined coupling member aligned with and driven by said input shaft, movement generating means for moving said coupling member out of coupling engagement with said input shaft, first means for urging said coupling member into coupled relationship with the input shaft, and second means acting between said coupling member and said movement generating means for urging said coupling member toward an uncoupled relationship with the input shaft, whereby actuation of said movement generating means will compress the first and second means to disconnect the coupling member from the input shaft.

11. A disconnectible drive, comprising,
 a. a housing,
 b. an input shaft rotatable in the housing and having clutch teeth at one end,
 c. a coupling member rotatable and axially movable in the housing and having clutch teeth at one end engageable with the clutch teeth on the input shaft,
 d. an output shaft rotatable in the housing and having a splined driving connection with the coupling member,
 e. a sleeve on the coupling member having a splined driving connection therewith and movable axially relative to the coupling member between opposite limits where the sleeve abuts the coupling member,
 f. a worm on the sleeve,
 g. a spring acting between the output shaft and the sleeve to urge the sleeve and coupling member toward the input shaft,
 h. a plunger in the housing engageable with the worm to thread the worm along the plunger to withdraw the sleeve and disengage the coupling member from the input member,
 i. a second spring acting between the sleeve and the coupling member to urge the coupling member away from the input shaft when the coupling member is withdrawn from the input shaft, and
 j. means to prevent reverse rotation of the sleeve when the coupling member is disengaged from the input shaft and the plunger remains engaged with the worm.

12. In a constant speed drive transmission having a housing, an input shaft extending into said housing, coupling means in said housing axially aligned with and selectively driven by said input shaft, a driven member splined to the other end portion of said coupling means, worm means splined to said coupling means for relative axial movement with respect to said coupling means, ratchet means on one end of said worm means, axially movable one-way detent teeth means extending toward said ratchet means, means acting between said driven member and said coupling means through the worm means for urging said coupling means into coupled relationship with the input shaft, and gear means movable into contact with said worm means whereby rotation of the input shaft and coupling means will thread the worm and coupling means away from the input shaft to disconnect the coupling means from the input shaft and will engage the ratchet means with the one-way detent teeth means so that the coupling means is moved axially away from the input shaft and the one-way detent teeth means prevents the coupling means from reengaging with said input shaft.

* * * * *